United States Patent

Anner

[15] 3,687,942
[45] Aug. 29, 1972

[54] 21-MERCAPTO-STEROIDS OF THE PREGNANE SERIES

[72] Inventor: Georg Anner, Basel, Switzerland

[73] Assignee: Ciba-Geigy Corporation, Ardsley, N.Y.

[22] Filed: Dec. 18, 1970

[21] Appl. No.: 99,680

[30] Foreign Application Priority Data

Dec. 25, 1969 Switzerland............19242/69

[52] U.S. Cl..........................260/239.55, 260/397.45
[51] Int. Cl............................................C07c 169/32
[58] Field of Search........Machine Searched Steroids

[56] References Cited

UNITED STATES PATENTS 2,814,632  11/1957  Nussbaum............260/397.45

*Primary Examiner*—Elbert L. Roberts
*Attorney*—Harry Goldsmith, Joseph G. Kolodny and Mario A. Monaco

[57] ABSTRACT

21-Mercapto-steroids of the pregnane series of the general formula

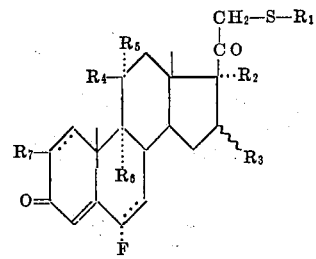

wherein
$R_1$ = H or an acyl radical
$R_2$ = H or free or esterified hydroxyl
$R_3$ = $CH_3$ or α-hydroxy, free or esterified or
$R_2 + R_3$ = alkylidene or cycloalkylidene dihydroxy
$R_4$ = Cl or free or esterified hydroxy
$R_5$ = H or
$R_4 + R_5$ = oxo
$R_6$ = H, Cl or F or
$R_4 + R_6$ = a double bond or an epoxy group
$R_7$ = H or, if a double bond in 1,2-position is present, also Cl, e.g., the 6α,9α-difluoro-2-chloro-16α-methyl-11β,17α-dihydroxy-21-acetyl-mercapto-pregna-1,4-diene-3,20-dione. Use: antiinflammating agents.

1 Claim, No Drawings

21-MERCAPTO-STEROIDS OF THE PREGNANE SERIES

The subject of the present invention is new 21-mercapto-steroids of the pregnane series of general formula

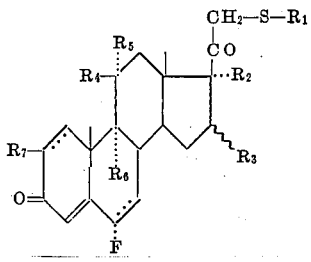

which can also possess a double bond in the 1,2- and/or in the 6,7-position, wherein $R_1$ denotes hydrogen or an acyl radical, $R_2$ denotes hydrogen or a free or esterified hydroxyl group, $R_3$ denotes a methyl group in the $\alpha$- or $\beta$-position or a free or esterified hydroxyl group in the $\alpha$-position, or $R_2$ and $R_3$ together represent an alkylidene-or cycloalkylidene-dioxy group, $R_4$ represents a chlorine atom or a free or esterified hydroxyl group, $R_5$ represents hydrogen or, together with $R_4$, also represents an oxo group, $R_6$ represents hydrogen or a chlorine or fluorine atom or, together with $R_4$, also represents a double bond or an epoxy group, or $R_7$ represents hydrogen or, if a 1,2-double bond is present, represents hydrogen or a chlorine atom, and a process for their manufacture.

The acyl radical is especially the radical of an aliphatic, alicyclic, araliphatic, aromatic or heterocyclic carboxylic acid which can also carry substitutents, primarily of acids with one to 18 carbon atoms, for example of formic acid, acetic acid, propionic acid, the butyric acids, valeric acids, such as n-valeric acid, or trimethylacetic acid, trifluoracetic acid, the caproic acids, such as $\beta$-trimethyl-propionic acid or diethylacetic acid, oenanthic, caprylic, pelargonic, capric and undecylic acids, for example undecylenic acid, lauric, myristic, palmitic or stearic acids, for example oleic acid, cyclopropane-, -butane-, -pentane- and -hexane-carboxylic acid, cyclopropylmethanecarboxylic acid, cyclobutylmethanecarboxylic acid, cyclopentylethanecarboxylic acid, cyclohexylethanecarboxylic acid, cyclopentyl-, cyclohexyl- or phenylacetic acids or -propionic acids, benzoic acid, phenoxyalkane-acids, such as phenoxyacetic acid, dicarboxylic acids, such as succinic acid, phthalic acid, quinolinic acid, furane-2-carboxylic acid, 5-tert.-butyl-furane-2-carboxylic acid, 5-bromofurane-2-carboxylic acid, nicotinic acid or isonicotinic acid.

Of the alkylidenedioxy or cycloalkylidenedioxy groups optionally present in the 16,17-position, those with three to six carbon atoms should be particularly emphasized, such as the isopropylidenedioxy, the cyclopentylidenedioxy or the cyclohexylidenedioxy group. Esterified hydroxyl groups are preferably those hydroxyl groups which are esterified with one of the abovementioned carboxylic acids, but also with sulphonic acids, such as methanesulphonic, ethanesulphonic, benzenesulphonic or p-toluenesulphonic acids, or with inorganic acids, such as phosphoric or sulphuric acid.

New compounds to be particularly emphasized are 6$\alpha$-fluoro-16$\alpha$-methyl-11$\beta$,17$\alpha$-dihydroxy-21-acetyl-mercaptopregna-1,4-diene-3,20-dione, 6$\alpha$,9$\alpha$-difluoro-16$\alpha$-methyl-11$\beta$,17$\alpha$-dihydroxy-21-acetylmercapto-pregna-1,4-diene-3,20-dione, 6$\alpha$,9$\alpha$-difluoro-11$\beta$,16$\alpha$,17$\alpha$-trihydroxy-21-acetylmercapto-pregna-1,4-diene-3,20-dione-16,17-acetonide, 6$\alpha$-fluoro-16$\alpha$-methyl-11$\beta$,17$\alpha$-dihydroxy-21-trimethylacetylmercapto-pregna-1,4-diene-3,20-dione, 6$\alpha$,9$\alpha$-difluoro-16$\alpha$-methyl-11$\beta$,17$\alpha$-dihydroxy-21-trimethylacetylmercapto-pregna-1,4-diene-3,20-dione and 6$\alpha$,9$\alpha$-difluoro-11$\beta$,16$\alpha$,17$\alpha$-trihydroxy-21-trimethylacetylmercapto-pregna-1,4-diene-3,20-dione-16,17-acetonide.

The new steroids possess valuable pharmacological properties, in contrast to corresponding known compounds which do not carry a 16$\alpha$-methyl group and a 6$\alpha$-fluorine. In particular, they possess a strong anti-inflammatory activity, as can be shown in animal experiments, for example on rats, in the foreign body granuloma test.

The new compounds can therefore be used as anti-inflammatory agents. They are however also intermediate products, for example for the manufacture of corresponding steroids possessing an acyl group in the 21-position, for which they are reacted with bases which are sufficiently strong to deprotonize the S-carrying methylene group, for example with alkali or alkaline earth alcoholates, such as potassium tert.-O-amylate or -butylate, but preferably with strong organic bases such as triethylamine in the presence of lithium salts such as lithium perchlorate, and optionally in the presence of a thiophilic compound such as a di- or tri-aryl-phosphine, for example triphenyl-phosphine.

The new compounds can be obtained in a manner which is in itself known. In particular, they can be obtained if a compound of general formula

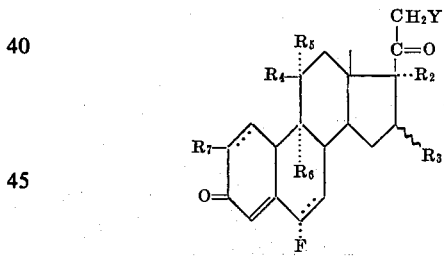

is reacted with a compound of formula Y—$R_1$, wherein $R_1$–$R_7$ has the abovementioned significance and one of the residues X and Y represents a reactively esterified hydroxyl group and the other represents the —S—M group, and M represents hydrogen or a metal atom, especially a metal of the first group of the periodic system, for example sodium or potassium. A reactively esterified hydroxyl group is particularly a hydroxyl group which is esterified with inorganic or organic strong acids, such as with hydrohalic acids, for example hydrochloric or hydrobromic acid, or with organic sulphonic acids, such as lower alkanesulphonic acid, or substituted or unsubstituted benzenesulphonic acid, for example methanesulphonic, ethanesulphonic, benzenesulphonic, p-toluenesulphonic or p-chlorobenzenesuphonic acid. This reaction is carried out in a manner which is in itself known, for example in an inert solvent such as a dilower alkylformamide, for example dimethylformamide, an ether, such as dioxan or tetrahydrofuran, an aliphatic ketone, such as acetone or methyl ethyl ketone, or dimethylsulphoxide.

In the resulting compounds substitutents can, if desired, be converted into others in a manner which is in itself known and/or double bonds introduced. Thus for example esterified hydroxyl groups, acylmercapto groups or alkylidene- or cycloalkylidene-dihydroxy groups can be split hydrolytically and/or free hydroxyl or mercapto groups can be esterified, for example with one of the above-mentioned acids or their acid anhydrides or acid halides. It is also possible, in compounds which do not possess a double bond in the 1,2-position and/or 6,7-position, to introduce such a double bond, for example with quinones, or, in resulting 11β-hydroxy compounds, to split off the 11β-hydroxy group with the formation of the 9,11-double bond. This can be converted into the 9,11β-epoxy group. This can in turn be converted into the 9α-fluoro-11β-hydroxy group, for example by treatment with hydrogen fluoride, preferably by hydrogen fluoride in urea. It is also possible to add chlorine to the 9,11- or the 1,2-double bond in the 9α,11β- or in the 2-position respectively.

The starting substances used for the present process are known or can, if they are new, be obtained in a manner which is in itself known.

The invention also relates to those embodiments of the process in which one starts from a compound obtainable as an intermediate product at any stage and carries out the missing stages or stops the process at any stage, or in which a starting substance is formed under the reaction conditions.

The present invention also relates to the manufacture of pharmaceutical preparations for use in human or veterinary medicine, which contain the new pharmacologically active substances of the present application, described above, as active substances together with a pharmaceutical excipient. Organic or inorganic substances which are suitable for enteral, for example oral, parenteral or topical, administration are used as excipients. Possible substances for forming the excipients are those which do not react with the new compounds such as for example water, gelatine, lactose, starch, magnesium stearate, talc, vegetable oils, benzyl alcohols, gum, polyalkylene glycols, white petroleum jelly, cholesterol and other known medicinal excipients. The pharmaceutical preparations can be in a solid form, for example as tablets, dragees or capsules, or in a liquid or semi-liquid form as solutions, suspensions, emulsions, ointments or creams. These pharmaceutical preparations are optionally sterilized and/or contain auxiliary substances such as preservatives, stabilizers, wetting agents, or emulsifiers, salts for regulating the osmotic pressure or buffers. They can also contain yet further therapeutically valuable substances. The new compounds can also serve as starting products for the manufacture of other valuable compounds.

The compounds of the present application can also be used as fodder additives.

The invention is described in more detail in the examples which follow.

EXAMPLE 1

4.88 g of 6α,9α-difluoro-16α-methyl-11β,17α,21-trihydroxy-pregna-1,4-diene-3,20-dione-21-mesylate are dissolved in 60 ml of dimethylformamide under nitrogen. A solution prepared at 5°C from 2.3 ml of thioacetic acid in 40 ml of dimethylformamide and 3.9 ml of diisopropylethylamine is added dropwise thereto at 27°C, while stirring. The temperature rises to 29°C. After 22 hours the brown-colored reaction solution is poured onto 500 g of ice, the mixture is stirred for 1 hour, and the precipitate which has separated out is filtered off. The filter residue is taken up in 500 ml of acetic acid ethyl ester and is twice washed with a mixture of 100 ml of concentrated ammonia and 100 mg of ice, once with 10 percent strength potassium dihydrogen phosphate solution and once with water. After evaporation of the acetic acid ethyl ester extract which has been dried over sodium sulphate, 4.44 g of crude product are obtained. This is purified by filtering its acetic acid ethyl ester solution through 440 g of silica gel and eluting with the same solvent. Yield 3.9 g. The 6α,9α -difluoro-16α-methyl-11β,17α-dihydroxy-21-thio-pregna-1,4-diene-3,20-dione-21-S-acetate recrystallized from acetic acid ethyl ester melts at 243°-246°C.

The above 21-mesylate can also be converted into the 21-S-acetate by boiling for 2½ hours with potassium thioacetate in acetone.

The starting substance is obtained by esterification of 4.15 g of 6α,9α-difluoro-16α-methyl-11β,17α,21-trihydroxy-pregna-1,4-diene-3,20-dione with a mixture of 58 ml of pyridine and 5.2 ml of methanesulphochloride for 1 hour at 0°C. The reaction solution is poured into a mixture of 280 ml of saturated sodium hydrogen carbonate solution and 140 g of ice, the product is filtered off, washed with ice water and taken up in methylene chloride, the methylene chloride solution is twice washed with water and the solvent is evaporated in vacuo. Yield = 4.88 g of 21-mesylate; no starting substance can be detected by thin layer chromatography.

EXAMPLE 2

4.68 g of 6α,9α-difluoro-16α-methyl-11β,17α-dihydroxy-21-thio-pregna-1,4-diene-3,20-dione-21-S-acetate are suspended in 150 ml of absolute ethanol in a nitrogen atmosphere at 24°C, while stirring. 11 ml of a 1 N solution of sodium methylate in methanol are added thereto. After 2 minutes the starting substance has dissolved to give a clear solution (temperature 25°C) and after a further 8 minutes the mixture is neutralized with 1.5 ml of glacial acetic acid. Thereafter it is cooled in an ice bath, the hydrolysis product is precipitated with 200 ml of water, filtered off, washed and taken up in acetic acid ethyl ester, and the solution is washed with water and concentrated by evaporation. Yield 4.2 g. After recrystallization from acetone-acetic acid ethyl ester, the 6α,9α-difluoro-16α-methyl-11β,17α-dihydroxy-21-thio-pregnane-1,4-diene-3,20-dione melts at 220°-226°C.

EXAMPLE 3

1.78 g of 6α,9α-difluoro-16α-methyl-11β,17α-dihydroxy-21-thio-pregna-1,4-diene-3,20-dione are treated in a nitrogen atmosphere with a mixture of 24 ml of pyridine and 2 ml of pivalic acid chloride prepared at −10°C. Thereafter the mixture is stirred for 1 hour at 0°C, the reaction solution is poured into ice water, and the reaction product which has precipitated as crystals is filtered off. The filter residue is washed with water, dried, and recrystallized from acetone/acetic acid ethyl ester. The resulting 6α,9α-difluoro-16α-methyl-11β,17α-dihydroxy-21-thio-pregna-1,4-diene-3,20-dione-21-S-pivalate (1.2 g) melts at 244°–246°C.

The same product is obtained if 6α,9α-difluoro-16α-methyl-11β,17α,21-trihydroxy-pregna-1,4-diene-3,20-dione-21-mesylate is reacted with thiopivalic acid in accordance with the data in Example 1.

EXAMPLE 4

1 g of 6α,9α-difluoro-11β,16α,17α,21-tetrahydroxy-pregna-1,4-diene-3,20-dione-16,17-acetonide is converted into the 21-mesylate in accordance with the data in Example 1. (Yield = 1.2 g).

The resulting 6α,9α-difluoro-11β,16α,17α,21-tetrahydroxy-pregna-1,4-diene-3,20-dione-16,17-acetonide-21-mesylate which according to thin layer chromatography is a single product, in 20 ml of dimethylformamide, is treated with 0.7 ml of thioacetic acid in 8 ml of dioxan and 1 ml of diisopropylethylamine in accordance with the data of Example 1, and worked-up. After filtering through 100 g of silica gel and crystallizing from methylene chloride, the 6α,9α-difluoro- 11β,16α,17α-trihydroxy-21-thio-pregna-1,4-diene-3,20-dione-16,17-acetonide-21-S-acetate melts at 285°C (with decomposition).

In an analogous manner, 6α-fluoro-11β,16α,17α-trihydroxy-21-thio-pregna-1,4-diene-3,20dione-16,17-acetonide-21-S-acetate can be obtained starting from 6α-fluoro-11β,16α,17α,21-tetrahydroxy-pregna-1,4-diene-3,20-dione-16,17-acetonide-21-mesylate. An entirely analogous procedure is followed in manufacturing 6α,9α-difluoro-2-chloro-16α-methyl-11β,17α-dihydroxy-21-thio-pregna-1,4-diene-3,20-dione-21-S-acetate and 6α-fluoro-2,9α,11β-trichloro-16α-methyl-17α-hydroxy-21-thio-pregna-1,4-diene-3,20-dione-21-S-acetate starting from the corresponding 21-O-mesylates.

EXAMPLES 5

The 21-mesylate obtainable from 1 g of 21-hydroxy-pregn-4-ene-3,20-dione, for example according to the data in Example 1, is dissolved in 20 ml of dimethylformamide and reacted in accordance with the data in Example 4 with 0.7 ml of thioacetic acid in 8 ml of dioxan and 1 ml of diisopropylamine, whereupon 21-thio-pregn-4-ene-3,20-dione-21-S-acetate is formed.

The same process is used for converting 6α-fluoro-16 α-methyl-11β,21-dihydroxy-pregna-1,4-diene-3,20-dione-21-mesylate into 6α-fluoro-16α-methyl-11β-hydroxy-21-thio-pregna-1,4-diene-3,20-dione-21-S-acetate.

In the above examples, the 21-chlorides, 21-bromides and 21-iodides, as well as the 21-tosylates, can also be used as starting substances in place of the 21-mesylates.

EXAMPLE 6

5.6 g of 6α,9α-difluoro-16α-methyl-11β,17α,21-trihydroxy-pregna-1,4-dien-3,20-dione-21-mesylate are dissolved in 90 ml of dimethylformamide in a nitrogen atmosphere. A solution of sodium thioformiate in 40 ml of dimethylformamide is added dropwise thereto at 27°C, while stirring. The temperature rises to 30°C. After 1 hour the reaction mixture is poured onto 500 ml of ice-water, while stirring, and the cristalline 21-thioformiate, which has separated out, is filtered off. The filter residue is washed with water, taken up in ethyl acetate and the solution washed twice with water. After evaporation of the ethyl acetate 5,5 g of crude 6α,9α-difluoro-16α-methyl-11β,17α-dihydroxy-21-thiopregna-1,4-dien-3,20-dione-21-S-formiate are obtained, which melts at 226°-229°C after recrystallization from ethyl acetate.

In a manner analogous to that described above and starting from 6α-fluoro-16αmethyl-11β,17α,21-trihydroxypregna-1,4-dien-3,20-dion-21-mesylate, or from 6α,9α-difluoro-11β,16α,17α,21-tetrahydroxy-pregna-1,4-dien-3,20-dione-16,17-acetonide-21-mesylate, there is obtained the 6α-fluor-16α-methyl-11β,17 α-dihydroxy-21-thiopregna-1,4-diene-21-S-formiate, respectively the 6α,9α-difluor-11β,16α,17α-trihydroxy-21-thiopregna-1,4-dien-3,20-dion-16,17-acetonide-21-S-formiate.

I claim:

1. 21-Mercapto-steroids of the pregnane series of general formula

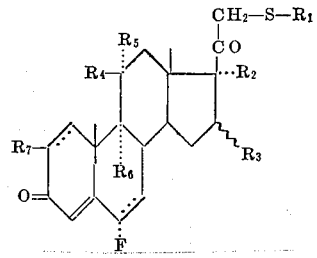

which can also possess a double bond in the 1,2-, wherein $R_1$ denotes hydrogen or an acyl radical, $R_2$ is hydrogen or a free or esterified hydroxyl group, $R_3$ represents a methyl group in the α- or β-position or a free or esterified hydroxyl group in the α-position or $R_2$ and $R_3$ together represent a three to six carbon atom alkylidene or cycloalkylidenedioxy group, $R_4$ represents a chlorine atom or a free or esterified hydroxyl group, $R_5$ represents hydrogen or together with $R_4$, represents an oxo group, $R_6$ stands for hydrogen or for a chlorine or fluorine atom or $R_4$ and $R_6$ together stand for a double bond or an epoxy group and $R_7$ represents hydrogen or, if a 1,2-double bond is present, represents hydrogen or a chlorine atom each of said esterified hydroxyl groups defining $R_2$, $R_3$ and/or $R_4$ being derived from carboxylic, sulfonic, phosphoric or sulfuric acid.

2. Compounds of the formula given in claim 1, wherein $R_1$ is the acetyl or trimethylacetyl group.

3. A compound as claimed in claim 1, wherein $R_1$ is the acetyl group, $R_2$ and $R_4$ each represents a hydroxy group, $R_3$ is an α-positioned methyl group, $R_6$ is a hydrogen or a fluorine atom and $R_5$ and $R_7$ each represents hydrogen, and which has a double bond in the 1,2-position.

4. A compound as claimed in claim 1, wherein $R_1$ is the acetyl group or the trimethylacetyl group, $R_2$ and $R_3$ together represent the α,α-dihydroxyacetonide group, $R_4$ is a hydroxy group, $R_5$ and $R_7$ each represents a hydrogen atom and $R_6$ stands for a hydrogen or a fluorine atom, and which has a double bond in the 1,2-position.

5. A compound as claimed in claim 1, wherein $R_1$ is the trimethylacetyl group, $R_2$ and $R_4$ each represents a hydroxy group, $R_3$ stands for a methyl group in the α-position, $R_5$ and $R_7$ each represents a hydrogen atom and $R_6$ stands for a hydrogen or a fluorine atom, and which has a double bond in the 1,2-position.

6. A compound as claimed in claim 1, wherein $R_1$ is the acetyl group, $R_2$ and $R_4$ each stand for a hydroxy group, $R_3$ is the α-methyl group, $R_5$ represents a hydrogen atom, $R_6$ stands for a fluorine atom and $R_7$ for a chlorine atom, and which has a double bond in the 1,2-position.

7. A compound as claimed in claim 1, wherein $R_1$ is the acetyl group, $R_2$ represents a hydroxy group, $R_3$ denotes a methyl group in the α-position, $R_4$, $R_6$ and $R_7$ each represents a chlorine atom and $R_5$ is a hydrogen atom, and which has a double bond in the 1,2-position.

8. A compound as claimed in claim 1, wherein $R_1$ is the acetyl group, $R_2$, $R_5$, $R_6$ and $R_7$ each represents hydrogen, $R_3$ stands for a methyl group in the α-position and $R_4$ is a hydroxy group, and which has a double bond in the 1,2-position.

* * * * *